(12) United States Patent
Bossard

(10) Patent No.: US 6,183,542 B1
(45) Date of Patent: Feb. 6, 2001

(54) METHOD AND APPARATUS FOR PURIFYING HYDROGEN

(76) Inventor: Peter R. Bossard, 33 Osmin Turn, Langhorne, PA (US) 19047

( * ) Notice: Under 35 U.S.C. 154(b), the term of this patent shall be extended for 0 days.

(21) Appl. No.: 09/188,128

(22) Filed: Nov. 9, 1998

(51) Int. Cl.⁷ .................................................. B01D 53/22
(52) U.S. Cl. ..................................... 96/11; 95/56; 55/524; 55/DIG. 5
(58) Field of Search ................................ 55/524, DIG. 5; 95/55, 56; 96/4, 11

(56) References Cited

U.S. PATENT DOCUMENTS

| | | | |
|---|---|---|---|
| 1,871,226 | * 8/1932 | Skala | 95/56 X |
| 3,350,846 | * 11/1967 | Makrides et al. | 96/11 X |
| 3,415,038 | * 12/1968 | Merten et al. | 95/55 X |
| 3,447,288 | * 6/1969 | Juda et al. | 96/11 |
| 3,469,372 | * 9/1969 | Yamauchi et al. | 96/11 |
| 3,782,077 | * 1/1974 | Hollister et al. | 96/11 |
| 3,828,527 | * 8/1974 | Briggs et al. | 96/4 |
| 4,454,894 | * 6/1984 | Tallon | 96/4 |
| 4,476,105 | * 10/1984 | Greenbaum | 95/55 X |
| 4,589,891 | * 5/1986 | Iniotakis et al. | 96/11 |
| 4,699,637 | 10/1987 | Iniotakes et al. | 96/10 |
| 5,498,278 | * 3/1996 | Edlund | 96/11 |
| 5,614,001 | * 3/1997 | Kosaka et al. | 96/10 |
| 5,652,020 | 7/1997 | Collins et al. | 427/230 |
| 5,703,359 | * 12/1997 | Wampler, III | 96/11 X |
| 5,734,092 | 3/1998 | Wong et al. | 73/23.25 |
| 5,782,960 | * 7/1998 | Ogawa et al. | 96/11 |
| 5,895,519 | * 4/1999 | Lorimer | 95/56 |

FOREIGN PATENT DOCUMENTS

| | | | |
|---|---|---|---|
| 62-102814 | * 5/1987 | (JP) | 96/11 |
| 63-004829 | * 1/1988 | (JP) | 96/11 |
| 1-262903 | * 10/1989 | (JP) | 96/11 |
| 2-144117 | * 6/1990 | (JP) | 96/11 |

* cited by examiner

*Primary Examiner*—Robert H. Spitzer
(74) *Attorney, Agent, or Firm*—LaMorte & Associates

(57) ABSTRACT

An assembly for separating molecular hydrogen from a volume of gas. The assembly includes a first conduit through which a gas at a first pressure flows, wherein the gas at least partially contains hydrogen. A second conduit intersects the first conduit. The second conduit is maintained at a pressure less than the first pressure of the first conduit. A hydrogen permeable membrane is disposed within the second conduit, wherein the membrane prevents the gas from flowing directly into the second conduit. Since the membrane is hydrogen permeable, a predetermined flow rate of hydrogen permeates through the membrane into the second conduit. The hydrogen permeable membrane contains a layer of hydrogen permeable material. The layer of hydrogen permeable material has a top surface and a bottom surface. A first metal mesh element is bonded to the top surface of the layer of hydrogen permeable material. Similarly, a second metal mesh element is bonded to the bottom surface of the layer of hydrogen permeable material, wherein the hydrogen permeable material is deformed into the second metal mesh. The mesh element supports the thin hydrogen permeable layer and prevents it from rupturing or collapsing.

16 Claims, 5 Drawing Sheets

METHOD AND APPARATUS FOR PURIFYING HYDROGEN

REFERENCE TO DOCUMENT DISCLOSURE

The matter of this application corresponds to the matter contained in Disclosure Document 444763 filed Sept. 21, 1998, wherein this application assumes the priority date of that document.

BACKGROUND OF THE INVENTION

1. Field of the Invention

The present invention relates to devices and methods that are used to separate molecular hydrogen from a volume of gas. More particularly, the present invention is related to methods and devices that separate hydrogen from a volume of gas by exposing the gas to a hydrogen permeable material through which only atomic hydrogen can readily pass.

2. Description of the Prior Art

In industry there are many applications for the use of molecular hydrogen. However, in many common processes that produce hydrogen, the hydrogen gas produced is not pure. Rather, when hydrogen is produced, the resultant gas is often contaminated with water vapor, hydrocarbons and other contaminants. In many instances, however, it is desired to have ultra pure hydrogen. In the art, ultra pure hydrogen is commonly considered to be hydrogen having purity levels of at least 99.999%. In order to achieve such purity levels, hydrogen gas must be actively separated from its contaminants.

In the prior art, one of the most common ways to purify contaminated hydrogen gas is to pass the gas through a conduit made of a hydrogen permeable material, such as palladium or a palladium alloy. As the contaminated hydrogen gas passed through the conduit, atomic hydrogen would permeate through the walls of the conduit, thereby separating from the contaminants. In such prior art processes, the conduit is kept internally pressurized and is typically heated to several hundred degrees centigrade. Within the conduit, molecular hydrogen disassociates into atomic hydrogen on the surface of the conduit and the conduit absorbs the atomic hydrogen. The atomic hydrogen permeates through the conduit from a high pressure side of the conduit to a low pressure side of the conduit. Once at the low pressure side of the conduit, the atomic hydrogen recombines to form molecular hydrogen. The molecular hydrogen that passes through the walls of the conduit can then be collected for use. Such prior art systems are exemplified by U.S. Pat. No. 5,614,001 to Kosaka et al., entitled Hydrogen Separator, Hydrogen Separating Apparatus And Method For Manufacturing Hydrogen Separator.

Conduits made of palladium and palladium alloys are highly expensive. As such, it is highly desirable to use as little of the palladium as possible in manufacturing a hydrogen gas purification system. However, in the prior art, the conduits made from palladium and palladium alloys hold gas under pressure and at high temperatures. Accordingly, the walls of the conduit cannot be made too thin, else the conduit will either rupture or collapse depending on the pressure gradient across the wall of the conduit.

A typical prior art conduit made from palladium or a palladium alloy would have a wall thickness of approximately 89 µm. The thickness of the wall of the conduit is directly proportional to the amount of purified hydrogen that passes through that wall in a given period of time. As such, in order to make the conduit more efficient, a thinner wall is also desirable. However, as has already been stated, a conduit wall cannot be made so thin that it ruptures or collapses under the pressure of the gases being passed through that conduit.

To further complicate matters, conduits made from palladium and palladium alloys may become less efficient over time as the interior walls of the conduits become clogged with contaminants. In order to elongate the life of such conduits, many manufacturers attempt to clean the conduits by reverse pressurizing the conduits. In such a procedure, the exterior of the conduit is exposed to pressurized hydrogen. The hydrogen passes through the conduit wall and into the interior of the conduit. As the hydrogen passes into the interior of the conduit, the hydrogen may remove some of the contaminants that were deposited on the interior wall of the conduit.

Due to the generally cylindrical shape of most prior art hydrogen purification conduits, the conduits are capable of withstanding a fairly high pressure gradient when the interior of the conduit is pressurized higher than the exterior of the conduit. However, when such conduits are cleaned and the external pressure of the conduit is raised higher than the interior pressure, a much lower pressure gradient must be used, else the conduit will implode.

In the prior art, improved conduit designs have been developed that attempt to minimize the amount of palladium used in a conduit, yet increase the strength of the conduit. One such prior art device is shown in U.S. Pat. No. 4,699, 637 to Iniotakis, entitled Hydrogen permeation membrane. In the Iniotakis patent, a thin layer of palladium is reinforced between two layers of mesh. The laminar structure is then rolled into a conduit. Such a structure uses less palladium, however, the conduit is incapable of holding the same pressure gradient as solid palladium conduits. Accordingly, the increase in efficiency provided by the thinner palladium layer is partially offset by the decreased pressure limits, and thus gas flow rate, that are capable of being processed.

Another prior art approach to limiting the amount of palladium used is to create membranes that are placed over apertures, like a skin on a drum. A pressure gradient is then created on opposite sides of the membrane, thereby causing hydrogen to flow through the membrane. Such prior art systems are exemplified by U.S. Pat. No. 5,734,092 to Wang et al., entitled Planar Palladium Structure. A problem associated with such prior art systems is that the palladium or palladium alloy membrane is typically positioned in a level plane, wherein a pressure gradient exists from one side of the membrane to the other. Since the membrane is flat, it has little structural integrity when trying to resist the forces created by the pressure gradient. Accordingly, in order to prevent the membrane from rupturing, solid perforated substrates are used to reinforce the membrane. The solid perforated substrates, however, are complicated to manufacture, restrict the flow through the membrane, and reduce the efficiency of the overall system.

A need therefore exists in the art of hydrogen purification for a system and method that can handle high flow rates of gas, per unit area, and yet uses only a minimal amount of hydrogen permeable material. A need also exists for a hydrogen purification system capable of withstanding large pressure gradients in opposite directions.

SUMMARY OF THE INVENTION

The present invention is an assembly for separating molecular hydrogen from a volume of gas containing both hydrogen and other contaminants. The assembly includes a first conduit through which a gas at a first pressure flows, wherein the gas at least partially contains hydrogen. A second conduit intersects the first conduit. The second conduit is maintained at a pressure less than the first pressure of the first conduit. A hydrogen permeable membrane is disposed within the second conduit, wherein the membrane prevents the gas from flowing directly into the second conduit. Since the membrane is hydrogen permeable, a predetermined flow rate of hydrogen permeates through the membrane into the second conduit.

The hydrogen permeable membrane contains a layer of hydrogen permeable material. The layer of hydrogen permeable material has a top surface and a bottom surface. A first metal mesh element is bonded to the top surface of the layer of hydrogen permeable material. Similarly, a second metal mesh element is bonded to the bottom surface of the layer of hydrogen permeable material. The mesh element supports the thin hydrogen permeable layer and prevents it from rupturing as it creates a barrier in between the first conduit and the second conduit. Furthermore, the layer of hydrogen permeable material is deformed into the second metal mesh, thereby giving the hydrogen permeable material added structural integrity and a place to expand when atomic hydrogen is absorbed.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Figure 1:
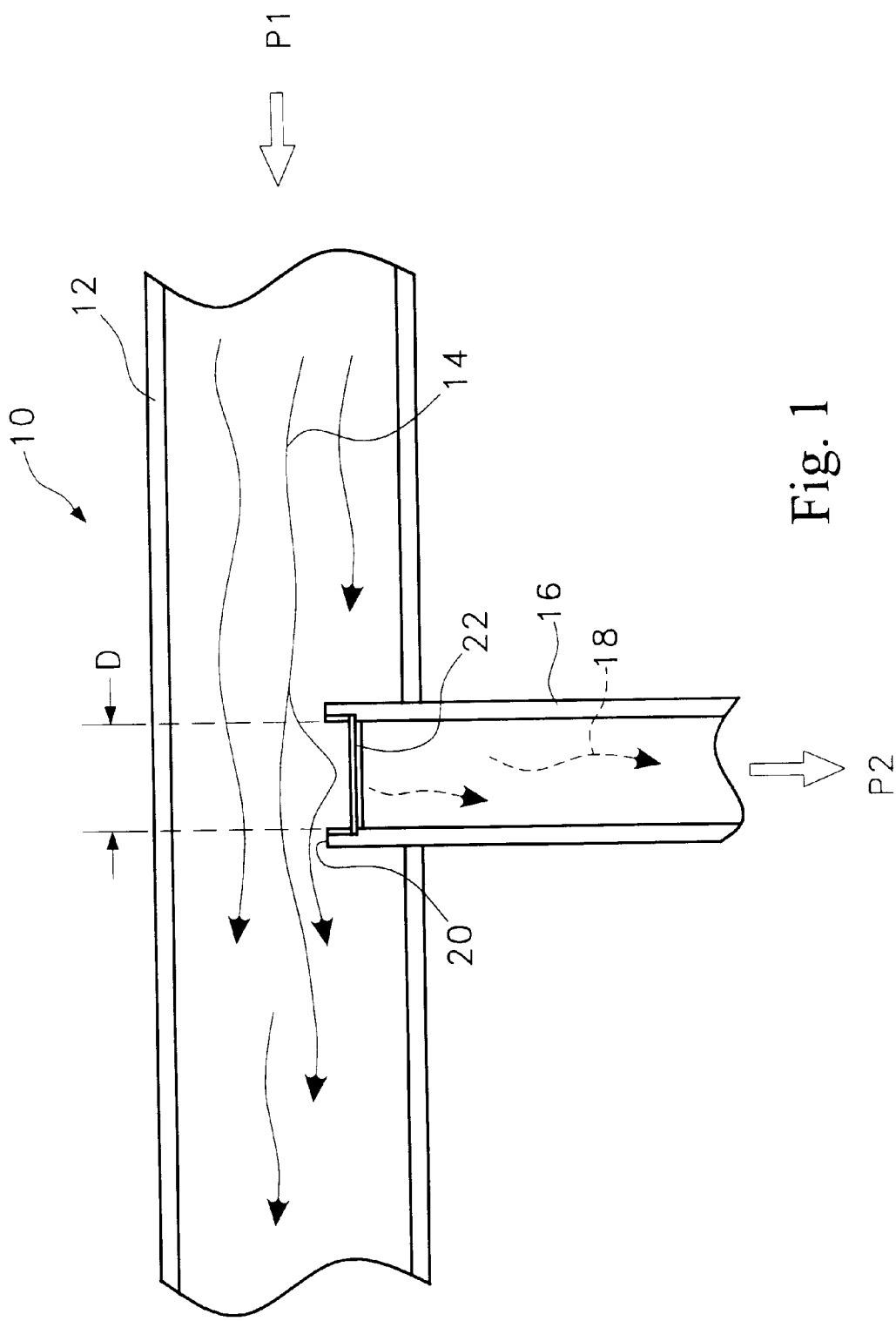
FIG. 1 is a cross-sectional view of one preferred embodiment of the present invention assembly.

Referring to FIG. 1, there is shown a schematic of an exemplary embodiment of the present invention hydrogen purification apparatus 10. The apparatus 10 contains at least one supply conduit 12 that is coupled to a source of contaminated hydrogen gas at a first pressure, P1. The supply conduit 12 is fabricated from stainless steel or an equivalent alloy that is capable of retaining the contaminated hydrogen gas 14 at the first pressure P1 and at a predetermined operating temperature. A drain conduit 16 intersects each of the supply conduits 12. The drain conduit 16 is used to receive purified hydrogen gas 18, as will later be explained. The drain conduit 16 is maintained at a second pressure P2, which is less than that of the first pressure P1 in the supply conduit 12. According, a positive pressure gradient exists between the supply conduit 12 and the drain conduit 16.

In FIG. 1, only one drain conduit 16 is shown intersecting the supply conduit 12. Such an arrangement is merely exemplary and it should be understood that one or any plurality of drain conduits 16 may intersect the same supply conduit 12. Obviously, by varying the number of drain conduits 16 used per supply conduit 12, the flow rate for the overall assembly can be selectively controlled.

The drain conduit 16 is preferably made from the same material as is the supply conduit 12. Accordingly, the rate of expansion is relatively the same between the supply conduit 12 and the drain conduit 16 across a range of temperatures. This reduces the stresses that exist in the joint between the supply conduit 12 and the drain conduit 16. Furthermore, the interior of the drain conduit 16 is preferably micro-polished using a passivating process. Such a polished finish helps to prevent contaminates from the surface of the conduit from re-entering the purified hydrogen stream. The same polish can also be used on the interior of the supply conduit 12, if desired.

The first end 20 of the drain conduit 16 terminates within the interior of the supply conduit 12. A membrane 22 is suspended across the interior of the drain conduit 16 near the first end 20. The membrane 22 is circular in shape to match the circular interior of the drain conduit 16. The diameter D of the membrane 22 ranges from approximately 1/8 inch to 3/4 inches. The diameter D of membrane 22 is selected depending upon the pressure gradient that exists between the supply conduit 12 and the drain conduit 16. The membrane 22 is sealed against the interior of the drain conduit 16 in a manner that will later be explained. The membrane 22 itself is a hydrogen permeable assembly of a unique construction that will also be later described. As such, the membrane 22 only permits hydrogen gas to pass from the supply conduit 12 into the drain conduit 16. Therefore, by collecting hydrogen gas 18 from the drain conduit 16, purified hydrogen gas can be had.

Figure 2:
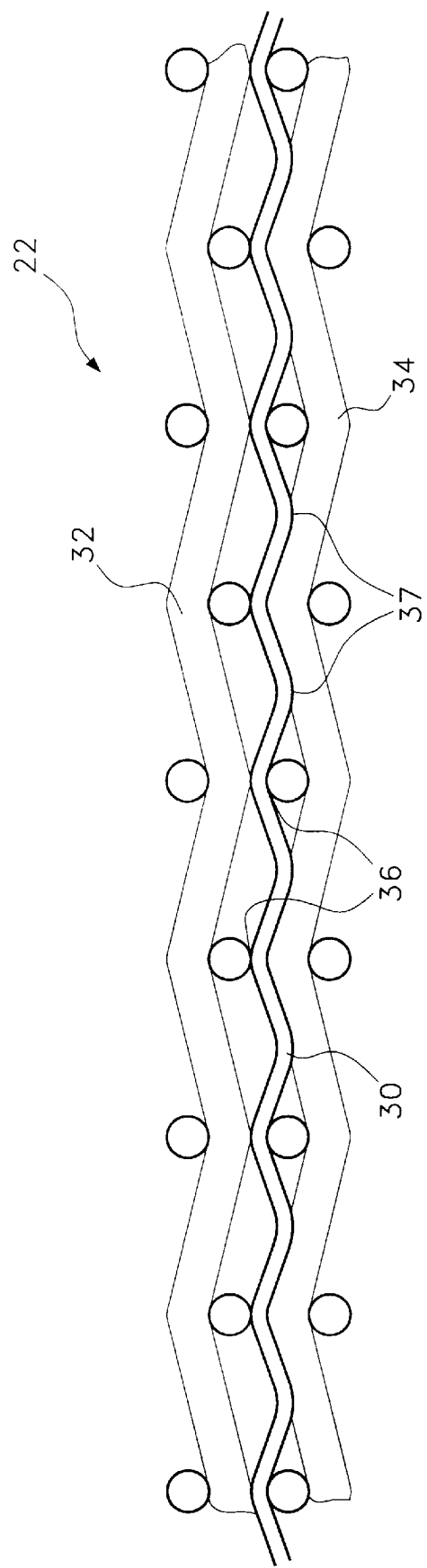
FIG. 2 is a cross-sectional view of a hydrogen permeable membrane in accordance with the present invention.

Referring to FIG. 2, it can be seen that the membrane 22 is comprised of a layer 30 of hydrogen permeable material supported between two mesh elements 32, 34. The hydrogen permeable material 30 can be a film of palladium, a palladium alloy such as PdAg, a palladium alloy layered with secondary materials such as tantalum, or some other combination of materials known in the art to be substantially hydrogen permeable. In the shown exemplary embodiment, the hydrogen permeable layer 30 of the membrane 22 is PdAg, having a thickness of only 2 $\mu$m. At this thickness, the hydrogen permeable layer 30 of the shown membrane 22 is forty four times thinner than the 89 $\mu$m wall thickness of many prior art hydrogen separation conduits. Accordingly, the hydrogen permeable layer 30 of the shown example membrane is approximately forty four times more efficient per unit area than the cited prior art example. Furthermore, the amount of PdAg used is approximately one forty fourth the amount used on the prior art example, per unit of hydrogen purified. The cost savings for material embodied by the present invention membrane is therefore clearly present.

The use of a 2 $\mu$m layer of hydrogen permeable material is merely exemplary and it should be understood that other thickness can be used in the present invention. The thickness of the hydrogen permeable layer 30 selected for use is dependent upon the material being used, the pressures within the apparatus and the flow rate of purified hydrogen desired. For example, a PdAg based hydrogen permeable layer 30 would preferably be rolled to a thickness of between 2 $\mu$m and 20 $\mu$m. A PdTaPd based hydrogen permeable layer would preferably be rolled to a thickness of between 2 $\mu$m and 50 $\mu$m.

The thin size of the hydrogen permeable layer 30 in the present invention would cause it to rupture if not reinforced.

The reinforcement is provided by the mesh elements 32, 34 that are present along the top surface and the bottom surface of the hydrogen permeable layer 30 of the membrane 22. The mesh elements 32, 34 can be of either a single or double weave. In a preferred embodiment, the mesh elements 32, 34 are stainless steel, having a mesh spacing of approximately 10 microns. However, other materials and other mesh sizes can be used as desired. The preferred mesh size, however, is preferably less than 50 microns. The mesh elements 32, 34 are also preferably chemically polished to remove any irregularities that may tear the hydrogen permeable layer 30 when attached to the hydrogen permeable layer 30.

The mesh elements 32, 34 have a mesh spacing that is preferably in the order of 2 to 20 times wider than the hydrogen permeable layer 30 is thick. This provides the room needed by the hydrogen permeable layer 30 to deform into the mesh element. In the embodiment of FIG. 2, both of the mesh elements 32, 34 are shown to be made of metal threads that are generally equivalent in size. Such an embodiment is merely exemplary and it should be understood that the mesh elements on either side of the hydrogen permeable membrane can be different sizes.

Additionally, the shown embodiment only shows one mesh element on either side of the hydrogen permeable membrane. It should be understood that multiple layers of mesh can be added to either side of the hydrogen permeable membrane 30 and that the different mesh elements can be of different sizes.

The mesh elements 32, 34 can be attached to the hydrogen permeable layer 30 of the membrane using either a brazing method or a tacking method. Both methods will be later explained. As such, the mesh elements 32, 34 attach to the hydrogen permeable layer 30. However, as can be seen from FIG. 2, the hydrogen permeable layer 30 does not lay flat between the mesh elements 32, 34.

Rather, the hydrogen permeable layer 30 is buckled in between the points of attachment to the mesh elements 32, 34. The pattern of the buckling in the hydrogen permeable layer 30 makes the hydrogen permeable layer 30 bow into concave regions 37 in between points of attachment. The concave regions 37 serve three functions. First, the concave regions 37 added a degree of structural integrity to the hydrogen permeable layer 30 in between the points of attachment with the mesh elements 32, 34. The structural integrity added by the concave regions 37 enables the hydrogen permeable layer 30 to withstand a higher pressure gradient of gas than would a flat hydrogen permeable layer of the same material.

The second advantage of the concave regions 37 is that it provides for the controlled expansion of the hydrogen permeable layer 30. As the hydrogen permeable layer 30 absorbs hydrogen, the hydrogen permeable layer 30 expands. If the hydrogen permeable layer were flat, the expansion of that layer could cause stress points that would subtract from the structural integrity of the hydrogen permeable layer. By adding concave regions 37 to the hydrogen permeable layer 30, the expansion of the hydrogen permeable layer 30 causes the radius of curvature associated with the hydrogen permeable layer 30 to change. Accordingly, the areas in which the hydrogen permeable layer 30 expands is predicted and managed in a way that the expansion does not detract from the structural integrity of the layer.

The third advantage of the concave regions 37 is that the concave shape of these regions 37 do increase the exposed surface area of the hydrogen permeable material per unit area. Since more of the hydrogen permeable material is exposed, the resultant flow rate for the membrane is increased.

The embodiment of FIG. 2, shows a membrane 22 assembled using a brazing method. In the brazing method the hydrogen permeable layer 30 is placed between the two mesh elements 32, 34. A fine coat of brazing powder is present on each of the mesh elements 32, 34. A suitable brazing powder would be gold or a gold alloy having a powder particle size in the order of one micron. The assembly is then placed in a vacuum furnace, wherein the assembly is compressed and heated until the brazing powder melts between mesh elements 32, 34 and the hydrogen permeable layer 30, thereby bonding these elements together at brazing points 36, which correspond to points of contact between the mesh elements 32, 34 and the hydrogen permeable layer 30.

To create the concave regions 37 in the hydrogen permeable layer 30, the membrane 22 is exposed to a large pressure gradient. In this procedure, the membrane is heated, one side of the membrane 22 is exposed to high pressured gas. The pressure gradient from one side of the membrane 22 to the other causes the hydrogen permeable layer 30 to buckle away from the high pressure gas, thereby producing the concave regions 37 previously described.

Figure 3:
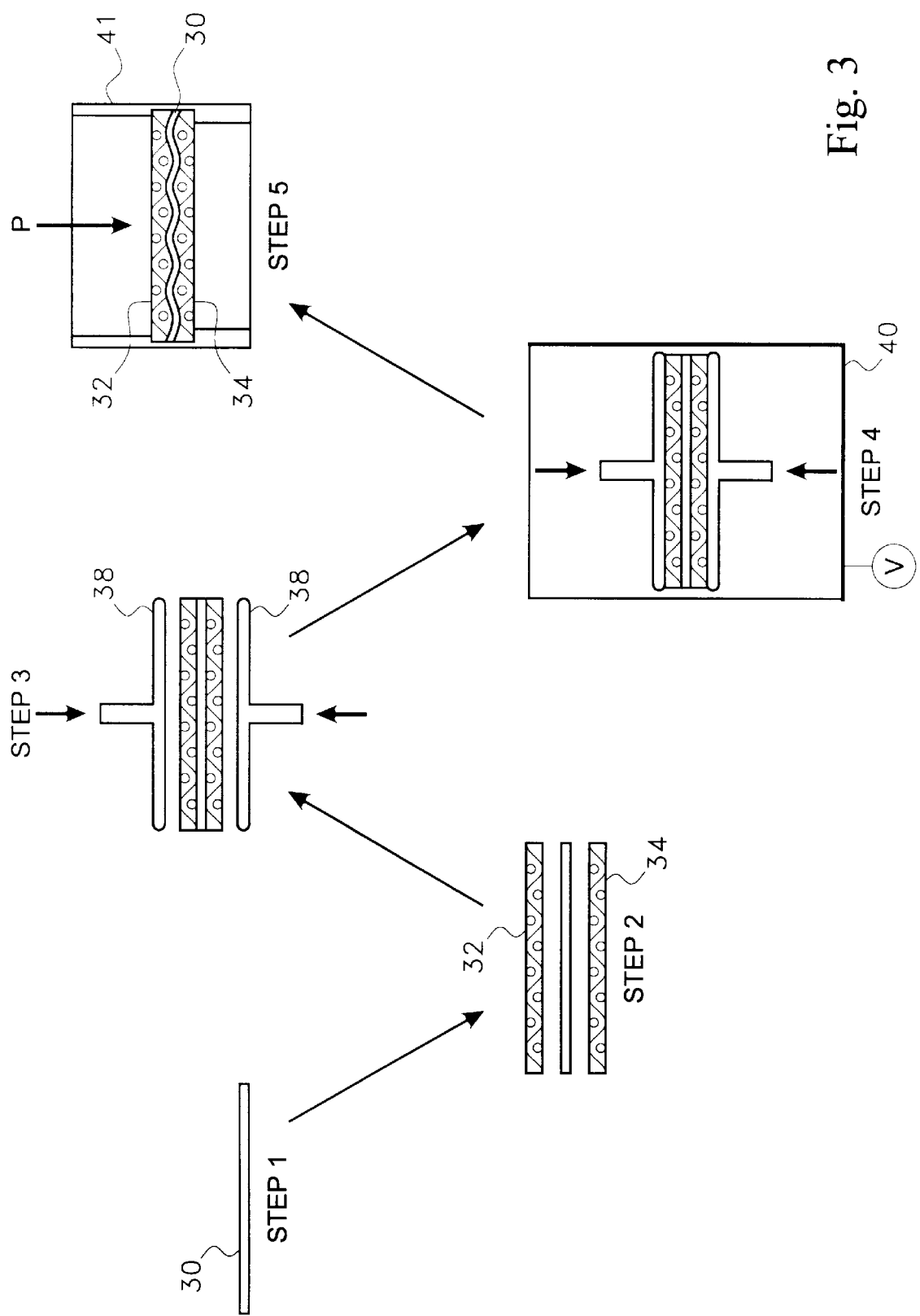
FIG. 3 is a schematic of an exemplary method of manufacture for a hydrogen permeable membrane in accordance with the present invention.

Referring to FIG. 3, an alternate method of manufacturing the present invention membrane is shown. In this method, the hydrogen permeable layer 30 is provided, as is shown in step 1. The hydrogen permeable layer 30 placed between the two micro-polished mesh elements 32, 34, as is shown in step 2. The mesh elements 32, 34 can be temporarily attached to the hydrogen permeable layer 30 with an adhesive, if desired. The assembly is then compressed between ceramic plates 38, or some other compression device, as is shown in step 3. The entire assembly is placed in a vacuum furnace 40, as is shown in step 4. There are many different devices available in the art for asserting a compression force on an object in a vacuum furnace. Any such prior art device can be adapted for use with the present invention.

The vacuum furnace 40 is evacuated to a low pressure at a temperature in the range of 1900° F. After a predetermined period of time at this temperature, the vacuum furnace 40 is cooled and the assembly is blown down with a non-reactive gas, such as argon or nitrogen. This procedure tacks the hydrogen permeable layer 30 to the mesh elements 32, 34 without the need for a brazing powder. Lastly, in step 5, the membrane can be placed in a high pressure chamber 41. The membrane is supported on one side of the membrane is pressurized with a non-reactive gas such as argon. The pressure P of the non-reactive gas is used to buckle the hydrogen permeable layer 30, into the configuration previously described. The pressure of the non-reactive gas used to deform the hydrogen permeable material is dependent upon the thickness of the hydrogen permeable material, the composition of the hydrogen permeable material, temperature, and the mesh size of the mesh elements 32, 34 supporting the hydrogen permeable layer 30.

Figure 4:
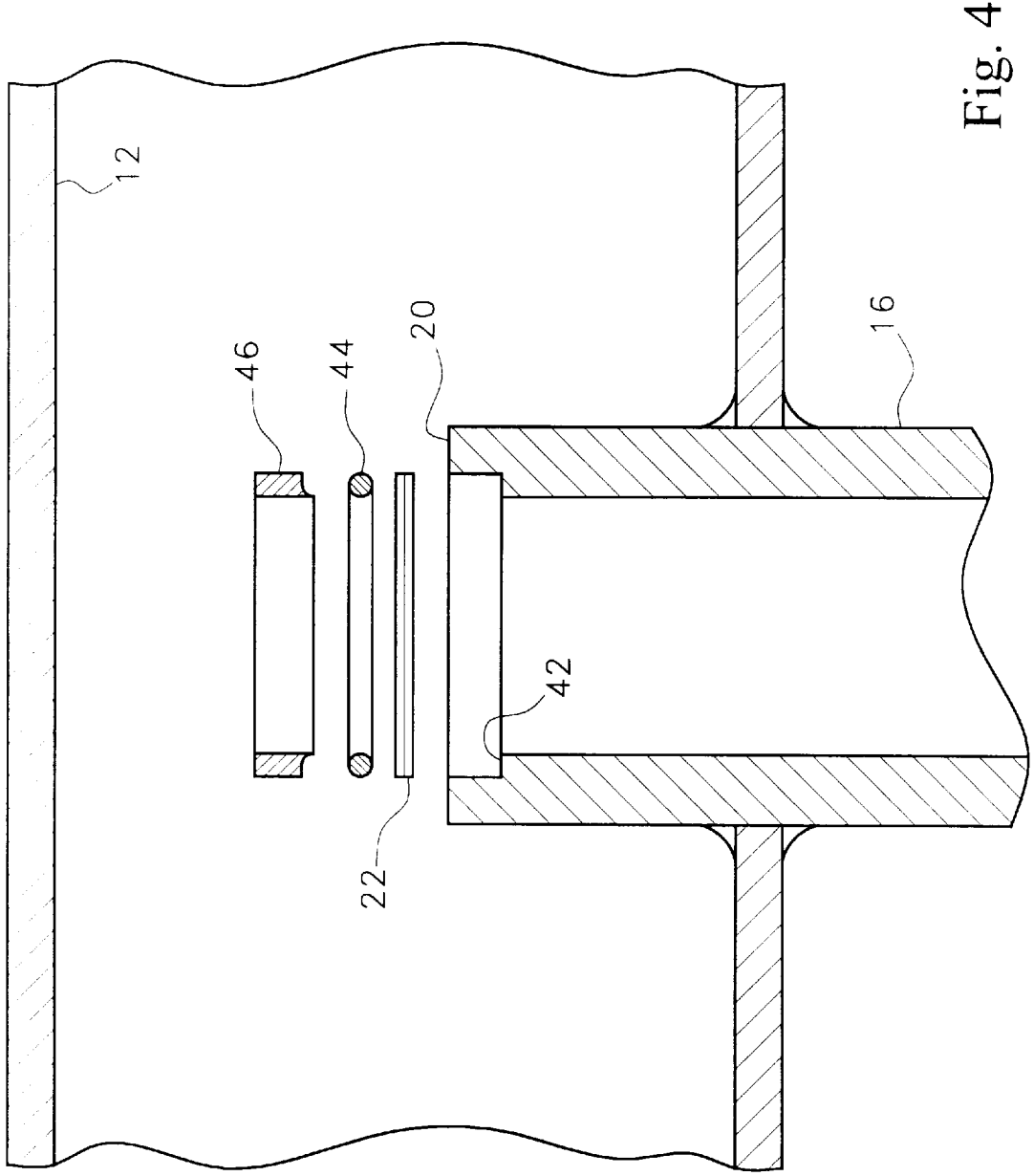
FIG. 4 is an enlarged exploded view of the segment of the embodiment contained in FIG. 1 that contains the hydrogen permeable membrane.

FIG. 4 is an enlarged and exploded view of the first end 20 of the drain conduit 16 that was previously shown in FIG. 1. Referring to FIG. 4, it can be seen that a depression is formed in the first end 20 of the drain conduit 16. The depression creates a ridge 42 on the interior of the drain conduit 16 near the first end. The membrane 22 is advanced into the first end 20 of the drain conduit 16 until the peripheral edge of the membrane 22 rests upon the ridge 42.

Once the membrane 22 is placed on the ridge 42, the peripheral edge of the membrane 22 does not automatically create a gas impervious seal with the interior of the drain conduit 16. Accordingly, brazing material 44 is placed along the peripheral edge of the membrane 22. The brazing material 44 can be a gold-nickel alloy, a silver alloy or any appropriate brazing composition. An annular collar element 46 is then placed atop the brazing material 44 and the assembly is heated above the melting point of the brazing material 44. As the brazing material 44 melts, it bonds both the membrane 22 and the annular collar 46 to the interior of drain conduit 16. The brazing material 44 also creates a gas impermeable seal around the periphery of the membrane 22. Consequently, any gas flowing from the supply conduit 12 to the drain conduit 16 must permeate through the membrane 22.

Figure 5:
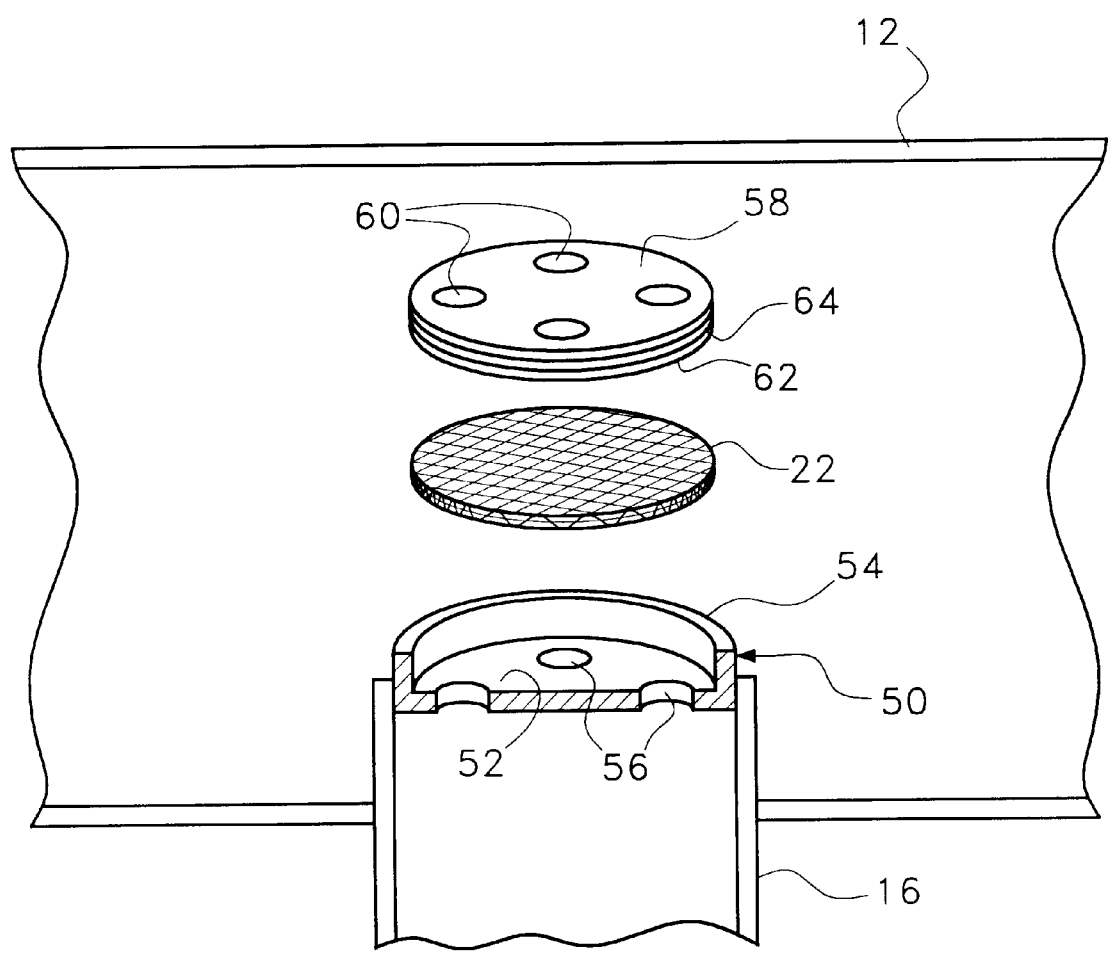
FIG. 5 is a partially cross-sectioned perspective view of a segment of the present invention containing an alternate embodiment of a mounting for a hydrogen permeable membrane.

Referring to FIG. 5, an alternate embodiment of the first end of the drain conduit is shown. In this embodiment, a cradle structure 50 is disposed at the first end of the drain conduit 16. The cradle structure 50 has a disk shaped bottom surface 52 and a cylindrical wall 54 that extends upwardly from the periphery of the bottom surface 52. A plurality of apertures 56 are disposed in the bottom surface 52 of the cradle structure 50, wherein the apertures 56 lead through to the drain conduit 16.

A membrane 22 rests upon the bottom surface 52 of the cradle structure 50 within the cylindrical wall 54. A cap element 58 is positioned over the membrane 22, wherein the cap element 58 also fits within the cylindrical wall 54 of the cradle structure 50. A plurality of apertures 60 are also formed through the cap element 58. The cap element 58 has a chamfered lower edge 62 and a recess 64 for retaining brazing material. During manufacture, the cap element 58 is used to press the membrane 22 against the bottom surface 52 of the cradle structure 50. The assembly is heated until the brazing material melts and adheres the cap element 58 to the cylindrical wall 54 of the cradle structure 50. The brazing material also adheres the membrane 22 to the cradle structure 50, thereby creating a gas impermeable seal around the periphery of the membrane 22.

Although the membrane 22 is pressed against the bottom surface of the cradle structure 50 and the bottom surface of the cap element 58, the membrane 22 does not seal against these surfaces. Rather, since the top surface and the bottom surface of the membrane 22 are mesh elements, gas is free to flow in between the cap element 58 and the membrane 22 as well as between the cradle structure 50 and the membrane 22. Accordingly, the apertures 60 in the cap element 58 expose the entire top surface of the membrane 22 to contaminated hydrogen gas from the supply conduit 12. Similarly, the apertures 56 in the cradle structure 50 draw molecular hydrogen from the full bottom surface of the membrane 22.

It will be understood that the various figures described above illustrate only exemplary embodiments of the present invention. A person skilled in the art can therefore make numerous alterations and modifications to the shown embodiments utilizing functionally equivalent components to those shown and described. All such modifications are intended to be included within the scope of the present invention as defined by the appended claims.

What is claimed is:

1. An apparatus for purifying hydrogen, comprising:
   a first conduit through which a gas at a first pressure flows, wherein said gas at least partially contains hydrogen;
   a second conduit having an open end that intersects said first conduit, wherein said second conduit is maintained at a pressure less than said first pressure; and
   a hydrogen permeable membrane disposed within said second conduit, said hydrogen permeable membrane including:
   a layer of hydrogen permeable material having a first side and a second side;
   a first mesh element bonded to said first side of said layer of hydrogen permeable material; and
   a second mesh element bonded to said second side of said layer of hydrogen permeable material, wherein said first mesh element and said second mesh element are separated by said layer of hydrogen permeable material, said second mesh element defining voids of a predetermined size, wherein said layer of hydrogen permeable material is deformed into said voids of said second mesh element thereby having a bulging configuration within said voids; and
   wherein said membrane enables hydrogen from said gas in said first conduit to permeate into said second conduit.

2. The apparatus according to claim 1, wherein said layer of hydrogen permeable material is between 2 $\mu$m and 20 $\mu$m thick.

3. The apparatus according to claim 1, wherein said layer of hydrogen permeable material is brazed to said first mesh element and said second mesh element.

4. The apparatus according to claim 1, further including:
   a first support element having a plurality of apertures disposed therethrough; and
   a second support element having a plurality of apertures disposed therethrough;
   wherein said layer of hydrogen permeable membrane is disposed between said first support element and said second support element.

5. The apparatus according to claim 1, wherein said hydrogen permeable membrane has a peripheral edge and said peripheral edge is brazed to said second conduit, thereby creating a gas impermeable seal between said peripheral edge and said second conduit.

6. The apparatus according to claim 1, wherein said layer of hydrogen permeable material is selected from a group consisting of palladium, palladium silver alloys and palladium tantalum composites.

7. The apparatus according to claim 6, wherein said first mesh element and said second mesh element both have a mesh size of less than 50 $\mu$m.

8. An improved hydrogen permeable membrane, comprising:
   a layer of hydrogen permeable material having a top surface and a bottom surface;
   a first metal mesh element bonded to said top surface of said layer of hydrogen permeable material; and
   a second metal mesh element bonded to said bottom surface of said layer of hydrogen permeable material, wherein said layer of hydrogen permeable material separates said first metal mesh element and said second metal mesh element, said second metal mesh element defining voids of a predetermined size, wherein said layer of hydrogen permeable material is deformed into said voids of said second metal mesh element, thereby providing said layer of hydrogen permeable material with a bulging configuration within said voids.

9. The membrane according to claim 8, wherein said first metal mesh element and said second metal mesh element are brazed to said layer of hydrogen permeable material.

10. The membrane according to claim 8, wherein said layer of hydrogen permeable material is between 2 $\mu$m and 20 $\mu$m thick.

11. The membrane according to claim 8, wherein said first metal mesh element and said second metal mesh element have a mesh size of less than 50 $\mu$m.

12. The membrane according to claim 8, wherein said membrane is circular in shape and has a diameter of between ⅛ inch and ¾ inches.

13. A method of manufacturing a hydrogen permeable membrane, comprising the steps of:

providing a film of hydrogen permeable material having a top surface and a bottom surface;

placing a first metal mesh against said top surface of said film;

placing a second metal mesh against said bottom surface of said film, wherein said second metal mesh defines voids of a predetermined size;

bonding said first metal mesh and said second metal mesh to said top surface and said bottom surface of said film, respectively, wherein said film of hydrogen permeable material separates said first metal mesh and said second metal mesh; and deforming said film of hydrogen permeable material into said voids of said second metal mesh, thereby providing said layer of hydrogen permeable material with a bulging configuration within said voids.

14. The method according to claim 13, wherein said step of deforming said film includes exposing opposite sides of said film to a pressure gradient, wherein said pressure gradient acts to deform said film into said second metal mesh.

15. The method according to claim 13, wherein said step of bonding includes compressing said first metal mesh and said second metal mesh against said film in a vacuum furnace.

16. The method according to claim 15, wherein said step of bonding includes brazing said first metal mesh and said second metal mesh to said top surface and said bottom surface of said film, respectively.

* * * * *